(12) United States Patent
Xiong et al.

(10) Patent No.: US 9,118,772 B2
(45) Date of Patent: Aug. 25, 2015

(54) METHOD AND APPARATUS FOR USE IN DISPLAYING CONTENT ON A CONSUMER ELECTRONIC DEVICE

(71) Applicants: Sony Corporation, Tokyo (JP); Sony Network Entertainment International LLC, Los Angeles, CA (US)

(72) Inventors: True Xiong, San Diego, CA (US); Charles McCoy, Coronado, CA (US)

(73) Assignees: Sony Corporation, Tokyo (JP); Sony Network Entertainment International LLC, Los Angeles, CA (US)

( * ) Notice: Subject to any disclaimer, the term of this patent is extended or adjusted under 35 U.S.C. 154(b) by 55 days.

(21) Appl. No.: 13/923,533

(22) Filed: Jun. 21, 2013

(65) Prior Publication Data
US 2014/0378183 A1    Dec. 25, 2014

(51) Int. Cl.
| H04B 1/38 | (2006.01) |
| H04M 1/725 | (2006.01) |
| G06F 1/16 | (2006.01) |
| H04M 1/02 | (2006.01) |

(52) U.S. Cl.
CPC ............. *H04M 1/72522* (2013.01); *G06F 1/16* (2013.01); *H04M 1/0214* (2013.01); *H04M 1/0235* (2013.01); *H04M 1/0245* (2013.01); *H04M 1/0247* (2013.01); *H04M 2250/16* (2013.01)

(58) Field of Classification Search
CPC ................. H04M 1/72519; H04M 1/72522; H04M 1/72527; G02F 1/133308; G06F 1/1423
USPC ......... 455/566, 550.1, 556.1; 349/58; 345/1.1
See application file for complete search history.

(56) References Cited

U.S. PATENT DOCUMENTS

| 7,215,313 | B2 | 5/2007 | Giraldo et al. | |
| 7,412,261 | B2* | 8/2008 | Tutikawa | 455/566 |
| 8,350,814 | B2 | 1/2013 | Kim et al. | |
| 2009/0298546 | A1* | 12/2009 | Kim et al. | 455/566 |
| 2010/0277665 | A1* | 11/2010 | Kuo et al. | 349/58 |
| 2011/0074655 | A1* | 3/2011 | Tan et al. | 345/1.1 |
| 2011/0216045 | A1* | 9/2011 | Tsuchida | 345/204 |

(Continued)

FOREIGN PATENT DOCUMENTS

EP    1558007    7/2005

OTHER PUBLICATIONS

Samsung; DualView TL 220 12.2 Megapixel Digital Camera Quick Start Manual; Sep. 15, 2009; pp. 24.

(Continued)

*Primary Examiner* — Danh Le
(74) *Attorney, Agent, or Firm* — Fitch, Even, Tabin & Flannery LLP

(57) ABSTRACT

Some embodiments provide portable handheld devices comprising: first and second displays; a controller; and a first display casing secured within the first display and a second display casing secured within the second display, the second display casing is moveable to move between closed and an open positions; wherein, when in the closed position, at least a majority of the second display is not visible; wherein, when in the open position, both the first display and the second display are visible and configured to display the graphical content; and wherein the controller is configured to cooperatively utilize both the first display and the second display when in the open position such that the graphical content is cooperatively displayed on both the first display and the second display.

19 Claims, 10 Drawing Sheets

(56) References Cited

U.S. PATENT DOCUMENTS

2011/0247249 A1 10/2011 Cao
2012/0242703 A1 9/2012 Sirpal et al.
2013/0002568 A1 1/2013 Selim

OTHER PUBLICATIONS

Nancy Owano; Transparent phone display has front-and-back touch; published at phys.org (http://phys.org/news/2012-06-transparent-front-and-back.html); Jun. 1, 2012; pp. 4.

* cited by examiner

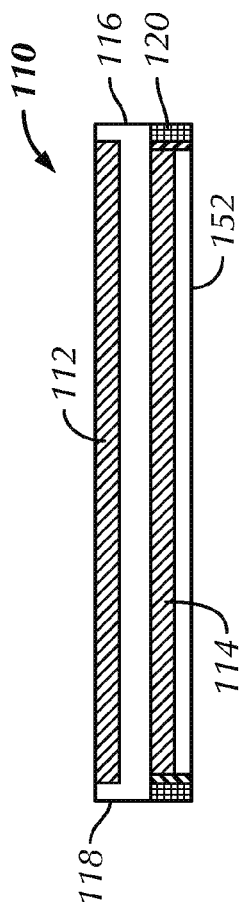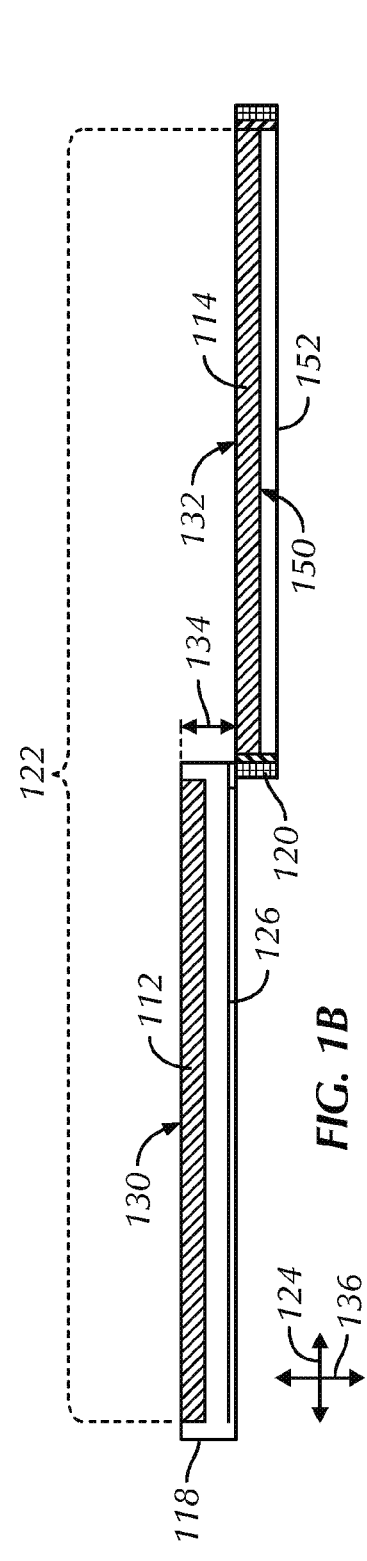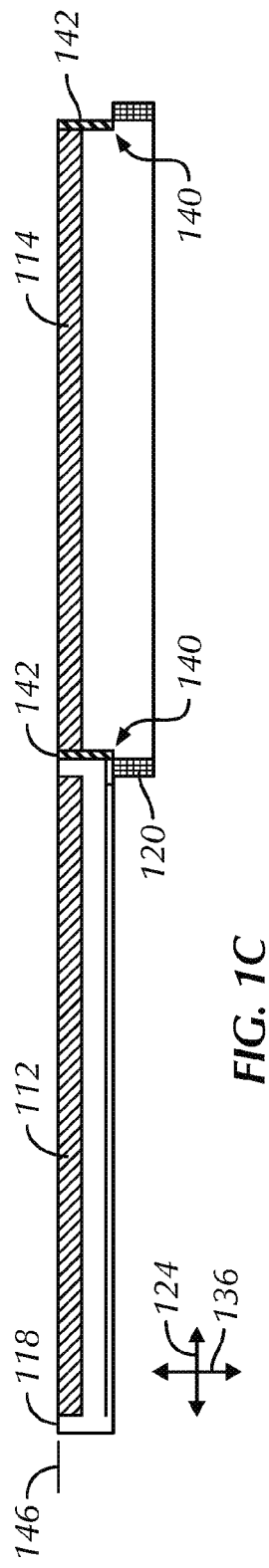

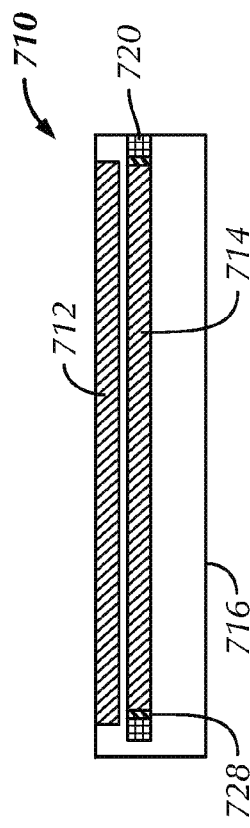
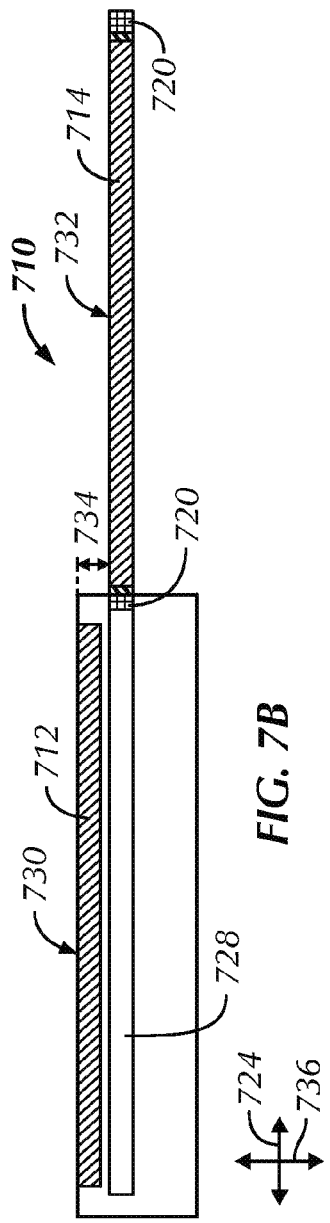
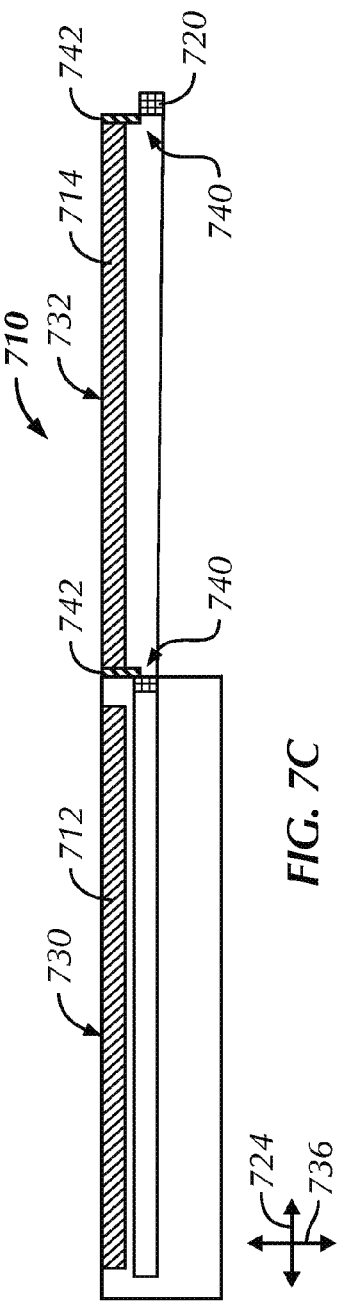
FIG. 7A
FIG. 7B
FIG. 7C

METHOD AND APPARATUS FOR USE IN DISPLAYING CONTENT ON A CONSUMER ELECTRONIC DEVICE

BACKGROUND

1. Field of the Invention

The present invention relates generally to consumer electronic devices, and more specifically to displaying graphical content on consumer electronic devices.

2. Discussion of the Related Art

Users are accessing content in greater amounts. Further, users are accessing this content through various devices. Numerous devices continue to provide improved ways to allow users to access content.

Still further, some devices display graphical content to users. Many of these devices are portable devices. Because the devices are intended to be portable, they often have displays with smaller sizes than devices that are not readily considered portable by the market place.

SUMMARY OF THE INVENTION

Several embodiments of the invention advantageously address the needs above as well as other needs by providing a portable handheld device. In some embodiments, the portable handheld device comprises: a first display; a second display, wherein the first display and the second display are configured to display graphical content comprising one or more of a graphical user interfaces and multimedia content; a controller configured to control the first display and the second display in displaying the graphical content on one or both of the first display and the second display; and a casing comprising a first display casing and a second display casing, wherein the first display is secured within the first display casing, and the second display is secured within the second display casing, wherein the second display casing is moveable relative to the first display casing and configured to be moved between a closed position and an open position and to position the second display relative to the first display; wherein, when the second display casing is in the closed position, at least a majority of the second display is not visible when the casing is oriented such that the first display is visible to a user and configured to display the graphical content; wherein, when the second display casing is in the open position, both the first display and the second display are visible and configured to display the graphical content; and wherein the controller is configured to cooperatively utilize both the first display and the second display when the second display casing is in the open position such that the graphical content is cooperatively displayed on both the first display and the second display.

Further, some embodiments provide methods of displaying content on a portable handheld device, the methods comprising: determining, through a controller of the handheld device, whether the handheld device is in an expanded viewing configuration with a first display of the handheld device positioned adjacent a second display of the handheld device when the second display is in an expanded viewing position such that the first display and a front side of the second display are simultaneously visible to a user, wherein the first display is secured within a first display casing and the second display is secured within a second display casing that is moveably secured relative to the first display casing and configured to move between a single display viewing position and the expanded viewing position; controlling the display of graphical content, when it is determined that the handheld device is in the expanded viewing configuration, cooperatively utilizing both the first display and the second display and cooperatively displaying the graphical content simultaneously on both the first display and the second display; determining an orientation of the handheld device when it is determined that the handheld device is in the single display configuration and not in the expanded viewing configuration; controlling the display of graphical content to be displayed on the first display when it is determined that the handheld device is in the single display configuration and oriented with the first display being visible to the user; and controlling the display of graphical content to be displayed through a backside surface of the second display when it is determined that the handheld device is in the single display configuration and oriented such that the backside surface of the second display is not substantially obscured by the handheld device.

BRIEF DESCRIPTION OF THE DRAWINGS

The above and other aspects, features and advantages of several embodiments of the present invention will be more apparent from the following more particular description thereof, presented in conjunction with the following drawings.

FIG. 1A depicts a simplified, cross-sectional view of an exemplary consumer electronic device, in accordance with some embodiments.

FIG. 1B shows a simplified cross-sectional view of the exemplary portable, handheld device of FIG. 1A, with a second display and second display casing moved to an open position.

FIG. 1C shows a simplified cross-sectional view of the exemplary portable, handheld device of FIGS. 1A-1B, further illustrating a display alignment assembly, in accordance with some embodiments.

FIG. 7A depicts a simplified, cross-sectional view of an exemplary portable consumer electronic device or handheld device, in accordance with some embodiments.

FIG. 7B shows the exemplary handheld device of FIG. 7A with a second display pulled out to an open position, in accordance with some embodiments.

FIG. 7C shows a simplified cross-sectional view of the exemplary portable, handheld device of FIGS. 7A-7B, further illustrating a display alignment assembly in accordance with some embodiments.

FIG. 9B shows a simplified cross-sectional view of the handheld device of

FIG. 9A and further showing a second display and a third display.

Figure 2A:
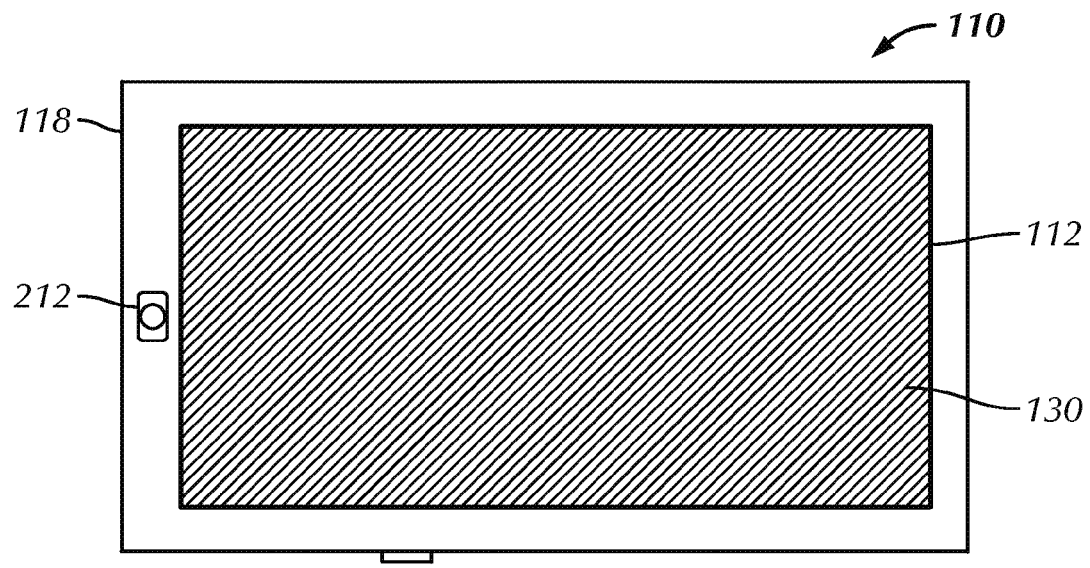
FIG. 2A shows a simplified, plane view of an exemplary portable, handheld device, in accordance with some embodiments.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," "some embodiments," "some implementations" or similar language means that a particular feature, structure, or characteristic described in connection with the embodiment is included in at least one embodiment of the present invention. Thus, appearances of the phrases "in one embodiment," "in an embodiment," "in some embodiments," and similar language throughout this specification may, but do not necessarily, all refer to the same embodiment.

FIG. 1A depicts a simplified, cross-sectional view of an exemplary consumer electronic device, such as a portable handheld device 110, in accordance with some embodiments, having a first display or screen 112 and a second display or screen 114. The consumer electronic device can be substantially any relevant consumer electronic device that comprises multiple displays that are cooperatively utilized in displaying graphical content. For example, the consumer electronic device can be a smart phone, portable gaming device, tablet, laptop, monitor, and other such devices. For simplicity, the below is described with reference to a portable, handheld device 110 such as a smart phone, tablet, gaming device or the like. Those skilled in the art, however, will appreciate that the description is not limited to such devices and instead can apply to other consumer electronic devices having multiple displays or advantageously can utilize multiple displays.

In some embodiments, the handheld device 110 comprises the first display 112, the second display 114 and a casing 116. The two displays are cooperatively utilized to display graphical content. The handheld device 110 includes one or more controllers (for example, see FIG. 11) that couple with and control one or both of the first and second displays. In some embodiments, the casing includes a first display casing 118 cooperated with the first display 112, and a second display casing 120 cooperated with the second display 114. In some embodiments, the first display casing 118 and/or the second display casing 120 form a frame and/or bezel around and hold the first display and second display, respectively. Further, the second display casing 120 is cooperating with the casing 116 and/or the first display casing 118 such that the second display is moveable relative to the first display casing and/or the casing, and is configured to be moved between at least a first or closed position and a second or open position. As such, the second display casing 120 is configured to position the second display 114 relative to the first display 112.

In FIG. 1A, the handheld device 110 is depicted with the second display 114 and second display casing 120 in the closed position (sometimes referred to as a single display viewing position). While in the closed position, a single display is typically visible. For example, in some implementations, when the second display 114 is in the closed position, at least a majority of the second display, and typically all of the second display, is not visible when the handheld device 110 and/or casing 116 is oriented such that the first display 112 is visible to a user and configured to display the graphical content. It is noted that, in some embodiments, the second display 114 may be configured as a dual display that can display graphical content that is visible from a side where the first display is located (sometimes referred to as a front side), or visible from a side opposite the first display (sometimes referred to as a backside). In some implementations, the second display 114 is positioned on an opposite side of and separated by the first display casing 118 from the first display 112 when the second display 114 is in the closed position.

The first display 112 and the second display 114 are configured to display graphical content. The graphical content can comprise one or more of multimedia content, textual content, graphical user interfaces, images, video, photographs, pictures, and substantially any other such content or combinations of such content. For example, the displays may be configured to display movies, high definition movies, high definition movies in three-dimensional (3D) format, graphical user interfaces to allow the user to control the various functions and/or applications provided through the handheld device 110, and other such content. Additionally, the first and second displays may be substantially any relevant display. For example, the first and/or second displays may be liquid-crystal displays (LCD), a light emitting diode (LED) display, a touch display, backlit LCD display, an organic LED (OLED) display, an active-matrix organic light-emitting diode (AMOLED), or other such relevant displays. Further, the second display can be a different type of display than the first display. Often, one or both of the first and second displays are touch sensitive displays that allows a user to interact with the handheld device by touching one or both of the first and second displays, such as when a user interface is displayed, when multimedia is being displayed, and the like. Further, some controls include simultaneous touches and/or patterns on both displays.

FIG. 1B shows a simplified cross-sectional view of the exemplary portable, handheld device 110 of FIG. 1A, with the second display 114 and second display casing 120 moved to an open position (sometimes referred to as an expanded viewing position). In the open position, the second display 114 is positioned adjacent the first display 112 with both the first display 112 and the second display 114 being visible, and typically a majority of and/or all of both displays are visible. In this configuration, content can be displayed cooperatively across both the first display 112 and the second display 114. In some embodiments, the two displays are cooperatively controlled and operated as a single large display or cooperative display area 122 such that the graphical content is displayed extending across both displays and simultaneously displayed across both the first display and the second display as though they were a single display.

Referring to FIGS. 1A-1B, in some embodiments, the casing 116 and/or the first display casing is slidably cooperated with the second display casing 120 such that the second display casing and second display slide parallel with a first axis 124. For example, in some implementations the casing 116, the first display casing 118 and/or the second display casing 120 include one or more slide mechanisms 126 or other such mechanisms that allow the second display casing and second display to be moved between the closed position and the open position. The slide mechanism(s) can include a tongue and groove configuration, a guide mechanism, a pin and guide mechanism, pantograph mechanisms, scissor mechanisms, rack and pinion, gearing, and/or other such mechanisms or combinations of such mechanisms. In some implementations, the slide mechanism 126 further includes one or more biasing mechanisms that bias the second display casing 120 in the closed position and/or the open position. Similarly, one or more latching mechanisms may be included to resist movement of the second display casing until desired (e.g., a user applies a force that exceeds a latching threshold that releases a latching mechanism). Other mechanisms can alternatively be utilized in the handheld device 110 to allow the second display to be moved between the closed position (single display viewing position) and the open position allowing for the expanded, simultaneous viewing of both the first display 112 and the second display 114. For example, a rotating pivot mechanism can be utilized to allow the second display to be rotated into the open position, one or more hinges can be employed to allow the second display to be opened into the open position, or other such mechanisms can be utilized.

When second display casing 120 and second display 114 are opened to the open position a majority of both the first display 112 and the second display 114 are visible when appropriately oriented toward the user. The two displays can be collectively controlled to operate as a single display such that graphical content can be displayed extending simultaneously across both displays. It is noted that the two displays, when in the open or extended viewing position, can independently be controlled and/or graphical content can be displayed individually on each display.

Further, a controller can be configured to control the display of content on one of the displays, transition to display content to extend across both displays, transition to display additional content (e.g., a graphical user interface, menu, notification, textual data, etc.) over one of the displays while multimedia content continues to be displayed on the other display, transitioning from displaying graphical content cooperatively on both displays to displaying the graphical content on one of the displays while displaying other graphical content (e.g., user interface) on the other display, and other such cooperative control and utilization of the two displays. For example, a controller controls the playback of a movie across both the first display 112 and the second display 114 as a single cooperative display area 122, detects a condition (e.g., in coming phone call, in coming text message, an alarm condition, etc.), transitions to displaying the movie on a smaller portion of the two displays (i.e., freeing up at least some of, for example, the second display) and simultaneously displays information about the detected condition (e.g., displaying the text message). Similarly, the controller could detect the condition, transition to playback the movie on only one of the two displays (e.g., the first display 112) while displaying information about the condition, a graphical user interface (e.g., to control the movie, respond to a text, etc.), or the like on the second display 114. Other cooperative uses of the two displays can be implemented. Additionally, in some implementations, the second display 114 may simultaneously display content on both a front side display surface sides 132 and a backside display surface 150. Still further, in some embodiments one or both of the front side display surface sides 132 and the backside display surface 150 can comprise a touch sensitive display such that the controller responds to touches on one or both surfaces. Further, the second display 114, in some embodiments, is transparent so that touches to the backside surface 150 can be readily lined up with content displayed on the front side surface 130 without obstructing the display with the user's fingers.

Further, in some embodiments, the graphical content can be displayed in a three-dimensional (3D) format across one or both of the first and/or second displays 112, 114. In some implementations, a controller is configured to display graphical content, when the second display casing and second display are in the open position, across both the first display and the second display in a three-dimensional format such that when viewed by a user at least some of the graphical content appears in three dimensions on both the first display and the second display. The 3D or stereoscopy content can be presented in several different formats that when viewed by one or more users provides a perception of being in three dimensions and creates an illusion of depth. For example, some embodiments may employ offset images with or without a separator, autostereogram methods, filtering (e.g., anaglyph, polarization, spectral comb filtering, wavelength multiplex visualization, etc.), eclipse methods, frame sequencing, lenticular lens technologies, parallax barrier technologies, and/or other such techniques.

Still referring to FIGS. 1A-1B, in some embodiments, the display of the graphical content is further controlled to enhance the visual appearance. For example, in some implementations, the display of the content is controlled to adjust a portion of the graphical content displayed on the second display compensating for expected differences in the distances between the user and the two displays and/or the distance 134 between a front side surface of the first display and a front side surface of the second display when the second display is in the expanded viewing position. As depicted in FIG. 1B, in some embodiments, a front side display surface 130 of the first display 112, through which the user views the graphical content, is offset by a distance 134 along a second axis 136, which is perpendicular to the first axis 124, from a front side display surface 132 of the second display 114, through which the user can view the graphical content. As such, the graphical content when displayed is displayed taking into account the difference in distance 134 between the two displays. As an example, when the second display 114 is further from the user, the controller can display the portion of the graphical content that is displayed on the second display in an enlarged or zoomed in format. The amount of enlargement is typically proportional to the distance 134 between the first display and the second display and the predicted distance from the displays to the one or more viewers' eyes. In some embodiments, the compensation for the distance 134 can further take into consideration the amount of the display area of each of the first display 112 and the second display 114 used in displaying the graphical content and/or the ratio between the distance 134 between the first and second displays and the display areas of the first and/or second displays, and other such factors.

FIG. 1C shows a simplified cross-sectional view of the exemplary portable, handheld device 110 of FIGS. 1A-1B, further illustrating a display alignment assembly 140, in accordance with some embodiments. The display alignment assembly 140 is cooperated with the second display 114 and second display casing 120 providing movement of the second display 114 generally parallel with the second axis 136. In some embodiments, the display alignment assembly 140 is configured to allow the second display 114 to be moved to reduce and/or eliminate the distance 134 between the front side display surface 130 of the first display 112 and the front side display surface 132 of the second display 114, effectively aligning the first and second displays. For example, in some embodiments, the display alignment assembly 140 comprises one or more slide mechanisms, lift mechanisms, pantograph mechanisms, scissor mechanisms or hinges, knife hinges, rack and pinion, gearing, or other such mechanisms, cooperated with both a second display casing 120 and an inner frame or bevel 142 that is secured with the second display 114. Some embodiments further include a seal, cover, transparent portion of the case 152 of the second display casing 120 that provides at least some protection for the second display 114 while allowing a backside display surface 150 to be visible to a user.

The display alignment assembly 140 allowing the inner frame 142 and second display 114 to move generally parallel with the second axis 136, which is typically perpendicular to the front side display surface 132, when the second display casing 120 and second display 114 are in the open position. In some embodiments, the display alignment assembly 140 is configured to allow the second display to be moved such that the second display 114 is substantially aligned along a plane with the first display 112, and/or that the front side display surface 130 of the first display 112 is aligned along a plane 146 with the front side display surface 132 of the second display 114. Biasing, springs and/or other such structures may be included to aid in moving and/or maintaining a position of the second display 114 in the aligned and/or non-aligned position. Similarly, latching mechanisms may further be utilized to maintain positioning of the second display (e.g., friction force latching, magnetics, biasing, etc.).

As described above, the mechanism to allow the second display 114 to be transitioned to the open position and adjacent the first display 112 can be through one or more slide mechanisms, hinge mechanisms, rotational mechanisms and the like. Some embodiments comprise a rotating pivot mechanism that can be utilized to allow the second display 114 to be rotated into the open position. For example, in some embodiments, the second display casing 120 is cooperated with the casing 116 and/or the first display casing 118 through a pivot point. In some instances the pivot point is positioned generally at a middle point along one of the sides of the second display casing 120. Further, a pivot point can be configured to allow the second display casing 120 and second display 114 to rotate out 180 degrees, such that the second display 114 is lined up beside the first display 112 and oriented with the same aspect ratio to form one large cooperative display area (e.g., a rectangular display area). Again the frame that rotates out can have a center portion that slides flush with the level of the first display.

Referring to FIGS. 1A-1C, in some embodiments, the second display 114 is configured as a dual sided display where the graphical content can be viewed from the front side display surface 132 when the second display is in the open or extended viewing position, and can be viewed from a backside display surface 150 that is opposite the front side display surface of the second display and oriented away from a front side display surface of the first display, for example, when the second display 114 in the closed position. In some embodiments, a controller of the handheld device 110 can be configured to detect an orientation of how the handheld device is being held by a user. For example, when the second display is in the closed position, the controller can determine whether the handheld device 110 is positioned such that the front side display surface 130 of the first display 112 is not substantially obscured by the handheld device and/or is being viewed by the user, or whether the handheld device 110 is positioned such that the backside display surface 150 of the second display 114 is not substantially obscured by the handheld device and/or is being viewed by the user. As described above, when the second display 114 and second display casing 120 are in the closed position, at least a majority of the second display is not visible when the handheld device 110 and casing 116 are oriented such that the first display is visible to a user. Alternatively, the controller can detect when the handheld device 110 is oriented with the backside display surface 150 of the second display directed at the user and fully visible to the user, and control the display of the graphical content to be visible through the backside display surface 150 of the second display.

In some embodiments, the handheld device 110 may track one or more physical aspects of the movement of the handheld device, such as for example acceleration, velocity along any axis, tilt, pitch, yaw, roll, and/or other such parameters. One or more methods and/or systems can be utilized within the handheld device to determine the orientation of the handheld device. For example, in some embodiments, the handheld device may include one or more inertial sensors, accelerometers, gyroscopes, tilt sensors, etc. (e.g., tilt sensors adapted to sense orientation of the handheld device with respect to tilt and roll axes, an accelerometer adapted to sense acceleration along a yaw axis, an accelerometer adapted to sense angular acceleration with respect to the yaw axis, and the like, or combinations thereof).

FIG. 2A shows a simplified, plane view of an exemplary portable, handheld device 110, in accordance with some embodiments, oriented with a first display 112 visible while a second display 114 and second display casing 120 are in the closed position and not visible to a user. In this orientation, the controller is configured to detect the orientation and direct the graphical content to be displayed through the first display 112 and visible through the front side display surface 130. In some embodiments, the handheld device 110 includes a camera or camera optics 212 that direct light to an internal camera or other such detector array. The front side camera optics 212 optically cooperated with an internal camera or detector array. The front side camera optics 212 are positioned on or relative to the front side display surface 130 of the first display 112 such that digital image data and/or video data can be captured of a scene or event occurring when the front side display surface 130 of the first display is oriented toward the scene or event attempting to be captured.

Figure 2B:
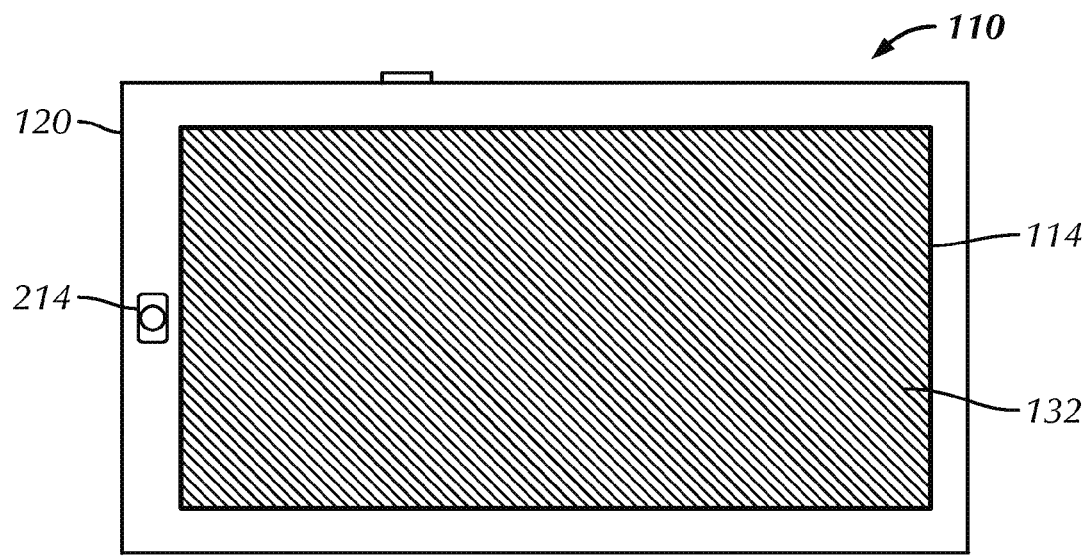
FIG. 2B shows a simplified, plane view of the exemplary portable, handheld device of FIG. 2A, in accordance with some embodiments.

FIG. 2B shows a simplified, plane view of the exemplary portable, handheld device 110 of FIG. 2A, in accordance with some embodiments. The handheld device 110 is oriented with at least a majority of the second display 114 visible while the first display 112 and second display casing 120 are in the closed position, and the first display is not visible (or directed away from a user). In this orientation, the controller is configured to detect the orientation and direct the graphical content to be displayed through the second display 114 and visible to the user through a backside display surface 150 of the second display.

Further, in some embodiments, the handheld device 110 further includes backside camera optics 214 that direct light to the same internal camera or other such detector array. The backside camera optics 214 optically cooperated with the internal camera or detector array. The backside camera optics 214 are positioned on or relative to the backside display surface 150 of the second display 114 such that digital image data and/or video data can be captured of a scene or event occurring when the backside display surface 150 of the second display is oriented toward the scene or event attempting to be captured. As such, a single camera or array can be utilized to capture events directed toward one or both sides of the handheld device 110. In some instances, the camera and/or array can simultaneously capture images and/or video from both directions using both the front side optics 212 and the backside optics 214. In other embodiments, a second camera or array is associated with the backside of the handheld device 110. The controller can control one or both displays to display some or all of the images detected by the camera prior to and/or after having recorded an image and/or video. For example, the controller can detect an orientation and display relative content on one or more of the displays based on a detected orientation, and/or a user can instruct the controller to display on one or more displays and/or select which of the front side or backside optics (or both) is to be utilized. Accordingly, some embodiments include a single camera cooperated with optics such that the single camera is configured to receive image and/or video data from a front side direction and/or a backside direction. The controller or a camera system controller can further be included in the handheld device that is configured to cause the single camera to capture image data from only one of the front side direction or the backside direction depending on an orientation, or in some instances both the front side direction and the back side direction.

Figure 3:
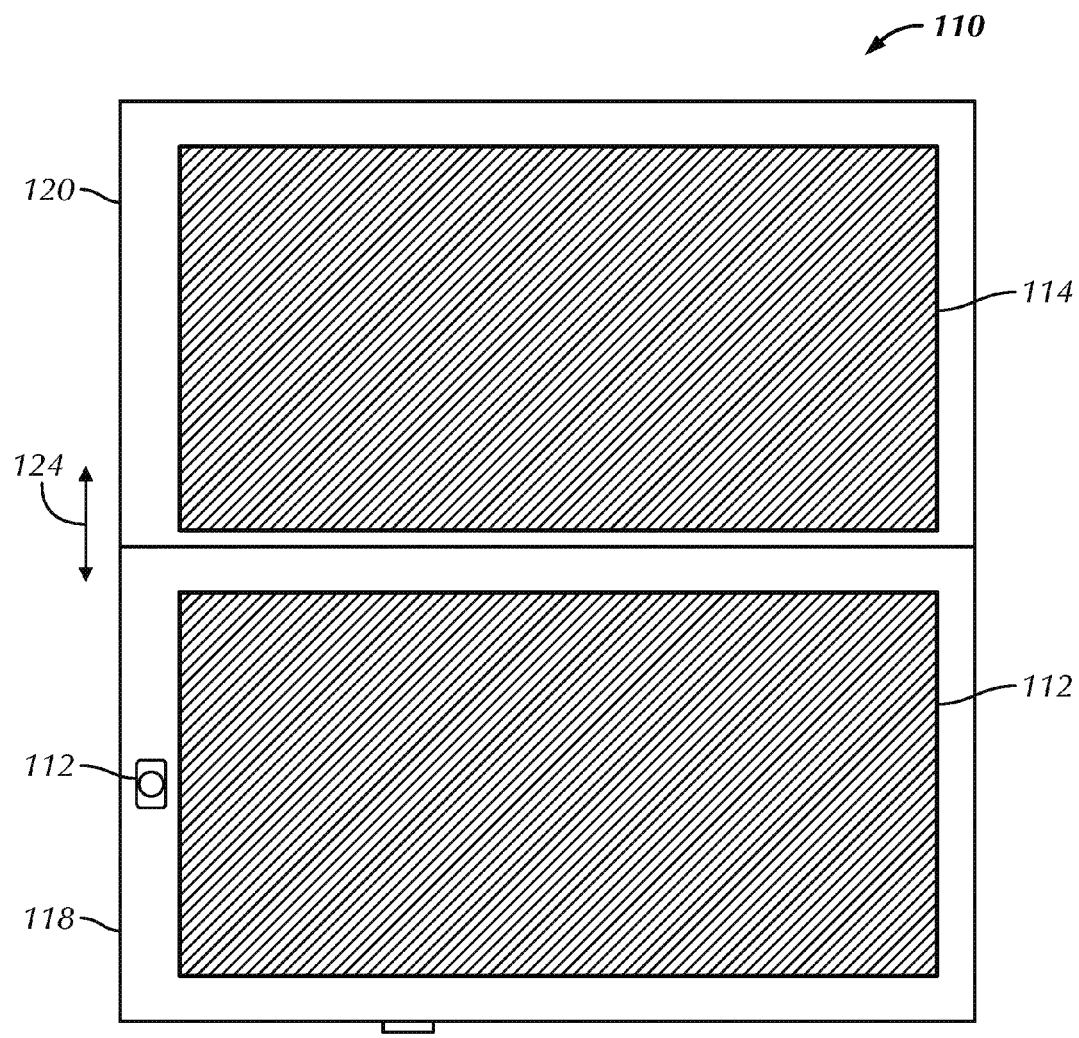
FIG. 3 shows a simplified, plane view of the exemplary portable, handheld device of FIGS. 2A-2B, in accordance with some embodiments.

FIG. 3 shows a simplified, plane view of the exemplary portable, handheld device 110 of FIGS. 2A-2B, in accordance with some embodiments. The handheld device is oriented with the second display 114 and second display casing 120 in open position such that both the first display 112 and the front side display surface 132 of the second display are visible and typically fully visible. In some embodiments, the first display 112 is slid relative to the second display 114 along a first axis 124 that is generally parallel with the front side display surfaces 130 and 132 of the first and second displays, respectively. In this orientation and positioning, the handheld device 110 provides an expanded view, and the controller is configured to cooperatively utilize both the first display 112 and the second display 114 so that the graphical content is cooperatively displayed and extends across one or both the first display 112 and the second display 114.

Figure 4:
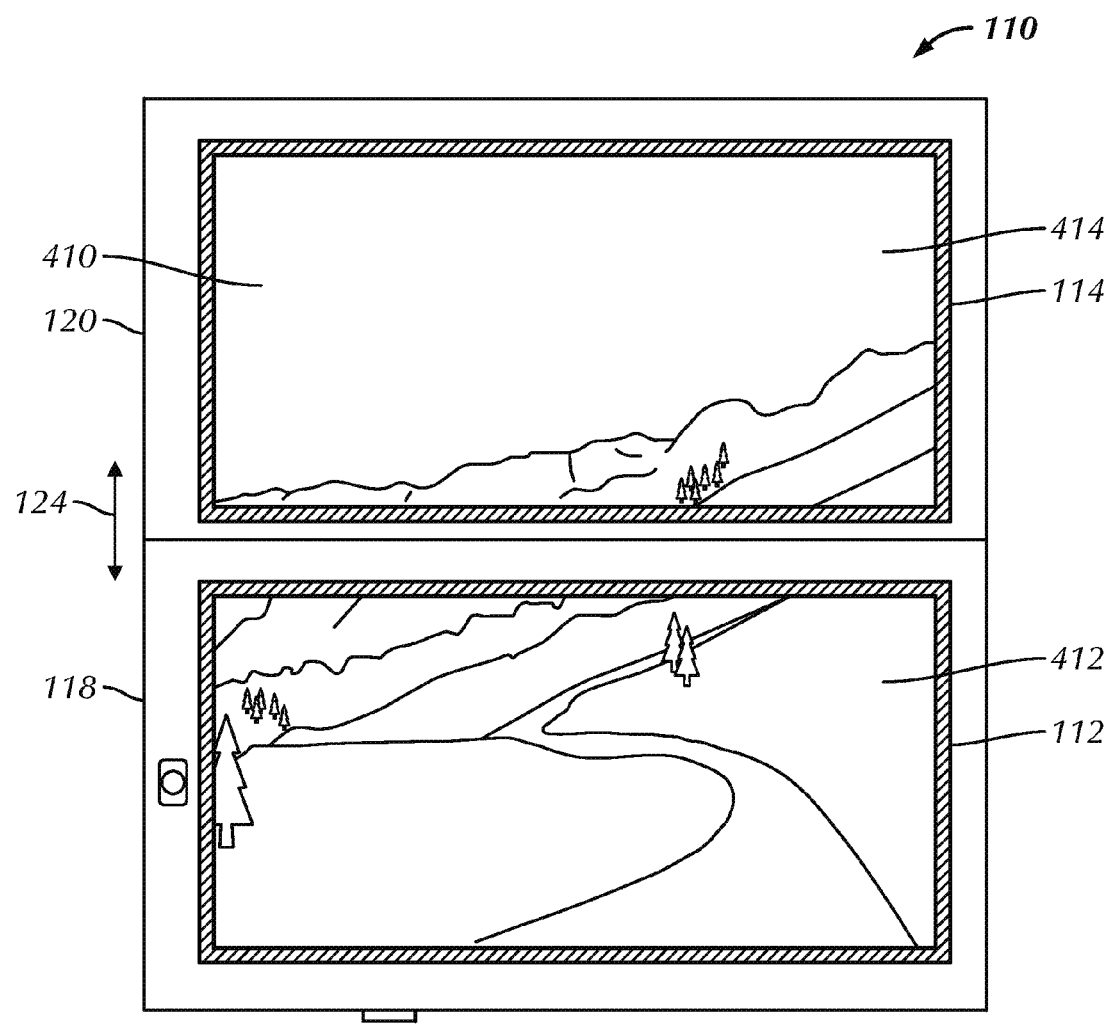
FIG. 4 shows a simplified, plane view of the exemplary portable, handheld device of FIG. 3, in accordance with some embodiments.

FIG. 4 shows a simplified, plane view of the exemplary portable, handheld device 110 of FIG. 3, in accordance with some embodiments. Again, the handheld device is in the open configuration with both the first display 112 and the front side display surface 132 of the second displaying being visible, and typically fully visible. Further, the controller detects the orientation and that the handheld device is in the open position and displays multimedia content 410 cooperatively and simultaneously across both the first display 112 and the second display 114. In this example, the controller is controlling the playback of a movie with each frame being split with a first portion or half of the frame 412 being displayed on the first display 112 and a second portion or half of the frame 414 being displayed on the second display. As described above, the controller can continue to cooperatively and/or independent utilize the two displays.

Figure 5:
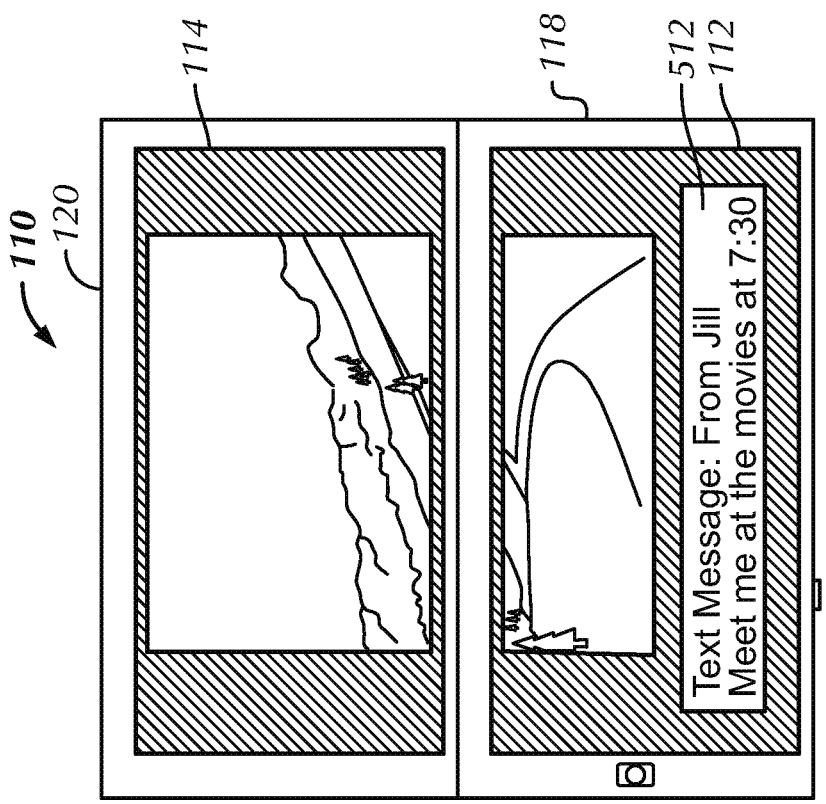
FIG. 5 shows a simplified, plane view of the exemplary portable, handheld device, in accordance with some embodiments.

FIG. 5 shows a simplified, plane view of the exemplary portable, handheld device 110, in accordance with some embodiments. In response to detecting a condition, orientation, alert, and/or other such factors, the controller can modify what is displayed and/or how it is displayed on one or both of the displays 112, 114. In the example depicted in FIG. 5, the controller, in response to detecting an incoming text message, can be configured to reduce the area of the first display 112 and second display 114 utilized in display the multimedia content and further displays a text message 512 and/or user interface to generate and display text messages.

Figure 6:
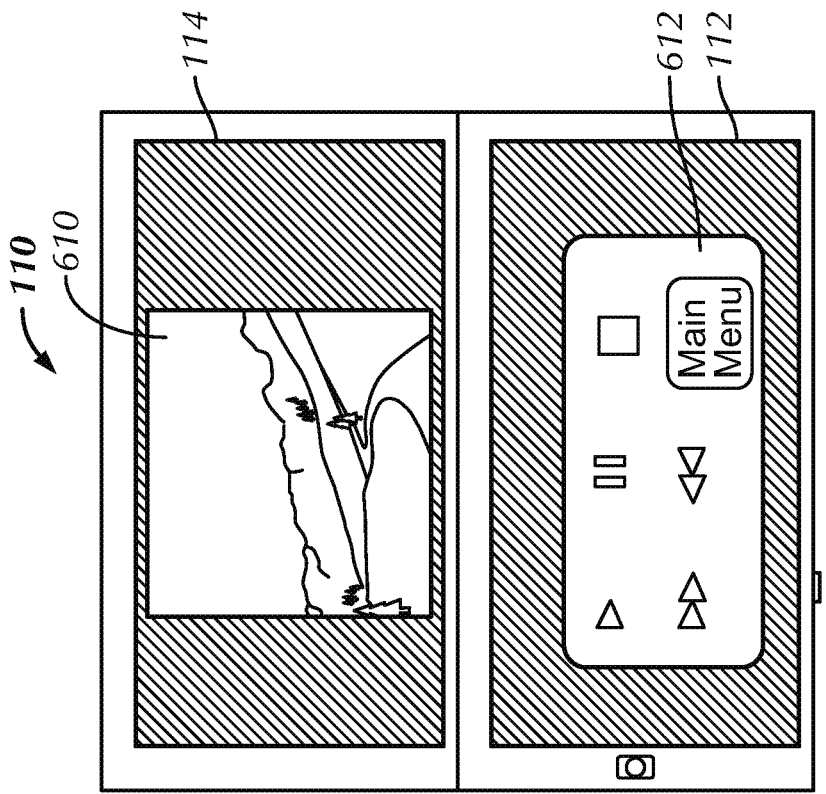
FIG. 6 shows a simplified, plane view of the exemplary portable, handheld device, in accordance with some embodiments.

FIG. 6 shows a simplified, plane view of the exemplary portable, handheld device 110, in accordance with some embodiments. The controller is further configured to modify what is displayed and/or how it is displayed to display additional graphical content. In the example depicted in FIG. 6, the controller has transitioned the playback of the multimedia content 610 to be display only on the second display 114, while a user interface 612 is simultaneously displayed on the first display 112. The user interface 612 can be substantially any user interface that allows the user to interact with the handheld device 110. For example, the user interface can be, but is not limited to, a user interface to control the playback of the multimedia content 610, to receive or initiate a phone call, to access and/or search content accessible over a distributed network (e.g., the Internet), to generate or receive a text message(s), to activate or interact with an application (or app) or game, and/or other such user interfaces. Further, in some embodiments, the controller is configured provide simultaneous operation of multiple applications, functions and the like, such as to continue to playback the multimedia content 610 while simultaneously allowing the user to interact with the user interface 612 or other such program or application being implemented by the controller. While traditionally the multiple screens are used in a cooperative manner, in some implementations one or more of the displays may show content that is independent from what is shown on other displays.

FIG. 7A depicts a simplified, cross-sectional view of an exemplary portable consumer electronic device or handheld device 710 in accordance with some embodiments. The handheld device 710 comprises a first display 712, a second display 714 and a casing 716. The casing 716 comprises a second display casing 720 secured with the second display 714.

The second display 714 and second display casing 720 are maintained in a closed position within an opening, compartment, port or the like 728 in the casing 716 of the handheld device 710. Typically, when in the closed position, the second display is not visible by a user while the first display 712 is visible when oriented toward the user. Further, the second display 714 and second display casing are configured to be pulled from the opening 728 to an open position where both the first display 712 and the second display 714 are simultaneously visible to the user when oriented accordingly. Again, the opening of the casing is configured to receive the second display casing and the second display when the second display and the second display casing are in the closed position.

FIG. 7B shows the exemplary handheld device 710 of FIG. 7A with the second display pulled out to the open position, in accordance with some embodiments. The casing 716 and/or the second display casing 720 include one or more slide mechanisms or other such mechanisms that allows the second display casing and second display to be moved between the closed position and the open position. In some implementations, the slide mechanism/s is configured to allow the second display 714 to be slid generally parallel with a first axis 724. Further, in some embodiments, the slide mechanism includes one or more biasing mechanisms. Similarly, one or more latching mechanisms may be included in some implementations, which may for example resist movement of the second display casing 720 from the closed position and/or the open position. With the second display 714 in the open or extended viewing position the handheld device is in an extended viewing orientation with the second display 714 adjacent the first display 712. In some instances, the second display is off-set from the first display by a distance 734 along a second axis 736, which is generally perpendicular to and the first axis 724 and a plane extending along a front side display surface 732 of the second display 714. In some embodiments, the second display 714 and/or mechanisms that allow the second display to transition between open and closed positions can be similar to the various embodiments described above, such as with reference to FIG. 1B.

FIG. 7C shows a simplified cross-sectional view of the exemplary portable, handheld device 710 of FIGS. 7A-7B, further illustrating a display alignment assembly 740 in accordance with some embodiments. The display alignment assembly 740 is cooperated with the second display 714 and second display casing 720 providing movement of the second display 714 generally parallel with the second axis 736. In some embodiments, the display alignment assembly 740 is configured to allow the second display 714 to be moved to reduce and/or eliminate the distance 734 between the front side display surface 730 of the first display 712 and the front side display surface 732 of the second display 714. For example, in some embodiments, the display alignment assembly 740 comprises one or more slide mechanisms, lift mechanisms, pantograph mechanisms, scissor mechanisms or hinges, knife hinges, rack and pinion, gearing, or other such mechanisms, cooperated with both a second display casing 720 and an inner frame or bevel 742 that is secured with the second display 714.

The display alignment assembly 740 allowing the inner frame 742 and second display 714 to move generally parallel with the second axis 736, which is typically perpendicular to the front side display surface 732, when the second display casing 720 and second display 114 are in the open position. In some embodiments, the display alignment assembly 740 is configured to allow the second display to be moved such that the second display 114 is substantially aligned along a plane with the first display 112, and/or that the front side display surface 130 of the first display 112 is aligned along a plane 146 with the front side display surface 132 of the second display 114. Biasing, springs and/or other such structures may be included to aid in moving and/or maintaining a position of the second display 114 in the aligned and/or non-aligned position. Similarly, latching mechanisms may further be utilized to maintain positioning of the second display (e.g., friction force latching, magnetics, biasing, etc.).

Figure 8A:
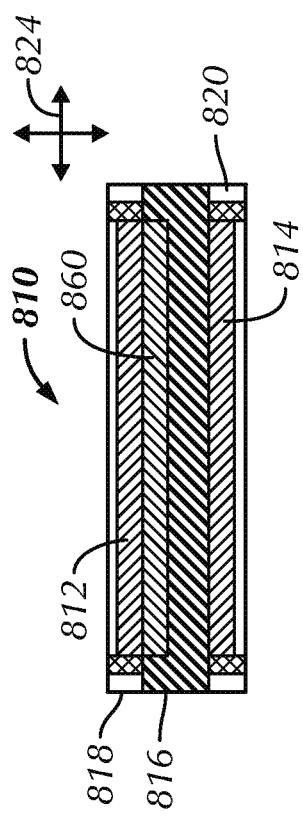
FIG. 8A depicts a simplified, cross-sectional view of an exemplary portable handheld device or consumer electronic, in accordance with some embodiments.

FIG. 8A depicts a simplified, cross-sectional view of an exemplary portable handheld device or consumer electronic 810 in accordance with some embodiments. The handheld device 810 comprises a first display 812, a second display 814, a third display 860 and a casing 816. The handheld device 810 includes one or more controllers that couple with and control one or more of the first, second and/or third displays. In some embodiments, the casing 816 cooperates with and secures the interior third display 860, and the casing 816 further comprises a first display casing 818 secured with the first display 812 and a second display casing 820 secured with the second display 814. Both the first display 812 and the second display 814 are configured to move between closed or single display viewing positions and open or extended viewing positions. For example, the first display 812 and first display casing 818 are configured to slide parallel with a first axis 824, but in opposite directions such that when both the first display 812 and the second display 814 are in their respective open positions all three displays are visible to a user. In some implementations, when the first and second displays are in their respective open positions, the first display 812 is separated from the second display 814 by a length or width of the third display 860.

Figure 8B:
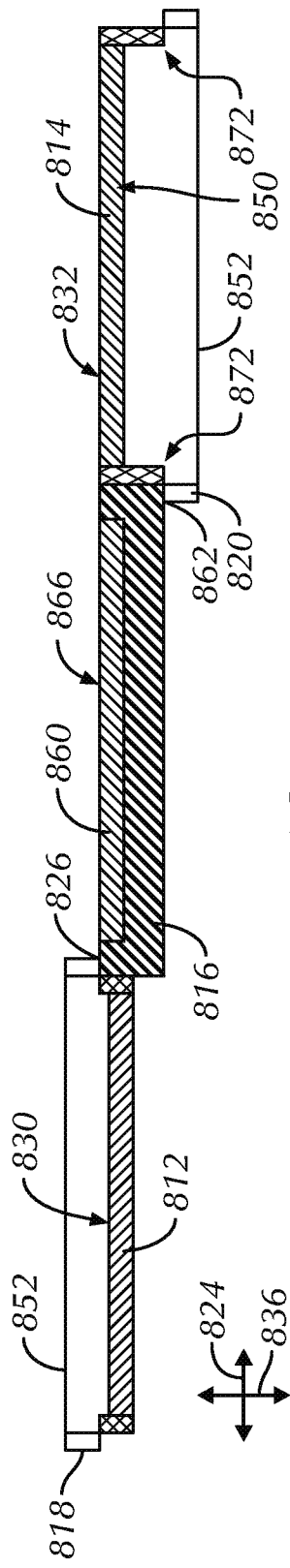
FIG. 8B shows the exemplary handheld device of FIG. 8A, in accordance with some embodiments, with a first display moved to an open position and a second display 814 moved to an open position.

FIG. 8B shows the exemplary handheld device 810 of FIG. 8A, in accordance with some embodiments, with the first display 812 moved to an open position and the second display 814 moved to an open position. In some embodiments, the casing 816, the first display casing 818 and/or the second display casing 820 include one or more mechanisms, such as slide mechanism, hinge, rotation mechanism or other such mechanisms or combinations of such mechanisms, that allows the first and/or second displays to be moved between the closed and open positions.

In some implementations, a first slide mechanism 826 is configured to allow the first display 812 to be slid generally parallel with the first axis 824 in a first direction, and/or a second slide mechanism 862 is configured to allow the second display 814 to be slid generally parallel with the first axis 824, and typically in an opposite direction as the first display. Further, in some embodiments one or more of the slide mechanisms includes one or more biasing mechanisms. Similarly, one or more latching mechanisms may be included to resist movement of the first or second display casings 818, 820 from the closed positions and/or the open positions. With one or both of the first or second displays in the open positions the handheld device 810 is in an extended viewing orientation with the first display 812 adjacent the third display 860 and the second display 814 also adjacent the third display 860. The second display 814 is shown as being mounted on a back of the handheld device 810. In other embodiments, however, the second display may be cooperated through other configurations, such as mounted within the handheld device 810 and slid out from the casing 816.

In some embodiments, the first display casing 818 includes a display alignment assembly 870. The display alignment assembly 870 is cooperated with the first display 812 and first display casing 818 providing movement of the first display 812 generally parallel with a second axis 836, which in some implementations is generally perpendicular to the first axis 824. Similarly, in some embodiments, the second display casing 820 includes a display alignment assembly 872 that is cooperated with the second display 814 and second display casing 820 providing movement of the second display 814 generally parallel with the second axis 836.

The display alignment assemblies 870, 872 are configured to provide movement of the first display 812 and the second display 814 to substantially align the first display 812 and second display 814 with the third display 860. In some embodiments, display alignment assemblies allow movement of the displays to align the front side display surface 830 of the first display 812 and/or the front side display surface 832 of the second display 814 with the front side display surface 866 of the third display 860. In other embodiments, the third display 860 may additionally or alternatively be cooperated with an alignment assembly that provides movement of the third display in achieving relative alignment of the displays or reducing separation between the displays. For example, the second and third displays may be moved parallel with the second axis 836 to align with the first display. Further, some embodiments may include one or more transparent case portions 852 that provide protection to one or more of the displays (e.g., protection for the first display 812 and the second display 814).

In some embodiments, when the first display 812 is in the closed position, the third display 860 is not visible. Similarly, when the first display 812 and the second display 814 are in their respective closed positions, and the handheld device 810 is oriented with the first display 812 directed toward and visible by a user, the majority of or all of the second display 814 is typically not visible. Further, in some implementations, the second display may be a dual sided display. In such implementations, some or all of the graphical content can be displayed and viewed from the front side display surface 832 of the second display 814 when the second display is in the open position, and can be viewed from a backside display surface 850 that is opposite the front side display surface 832 of the second display and oriented away from a front side display surface of the first display, for example, when in the closed position and/or the handheld device 810 is oriented with the backside display surface 850 facing the user. As described above, in some embodiments, a controller or multiple controllers can cooperatively detect an orientation of the handheld device 810 and implement display of graphical content on one or more of the displays depending on the detected orientation of the handheld device relative to a user and whether the first and/or second displays are in the open or closed positions. Two or more of the displays can be used cooperatively or independently. Other configurations can be provided that allow a user to access multiple displays in a portable, handheld device.

Figure 9A:
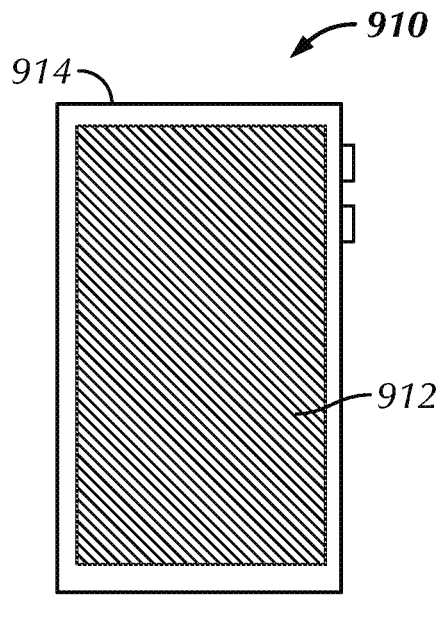
FIG. 9A shows a simplified plane view of an exemplary portable, handheld device or other such consumer electronic device, in accordance with some embodiments.
Figure 9B:
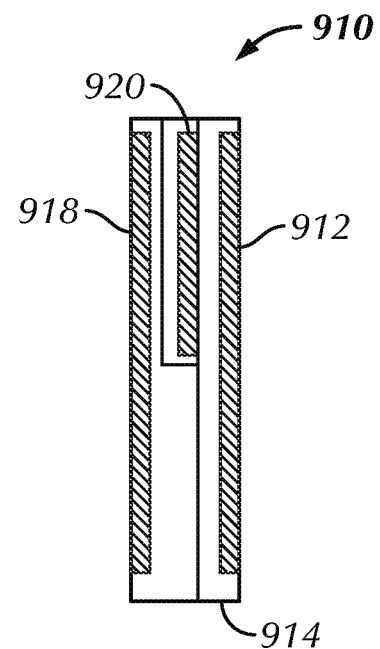

FIG. 9A shows a simplified plane view of an exemplary portable, handheld device or other such consumer electronic device 910 in accordance with some embodiments. The handheld device 910 includes a first display 912 and a casing 914. FIG. 9B shows a simplified cross-sectional view of the handheld device 910 of FIG. 9A and further showing a second display 918 and a third display 920. The second display and third display can be moved between respective closed positions and open positions.

Figure 9C:
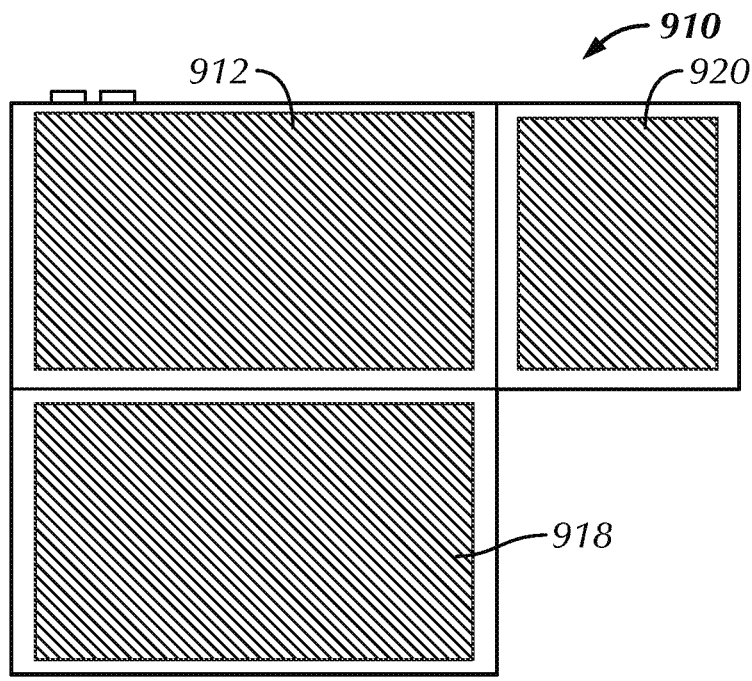
FIG. 9C shows a simplified plane view of the handheld device of FIGS. 9A-9B, further illustrating a second display and a third display in respective open positions, in accordance with some embodiments.

FIG. 9C shows a simplified plane view of the handheld device 910 of FIGS. 9A-9B, further illustrating the second display 918 and the third display 920 in their respective open positions, in accordance with some embodiments. Additionally, the second display 918 can be moved independent of the third display 920 (e.g., second display can be in the open position and visible to a user, while the second display is in the closed position and not visible to the user). In this configuration, the second display 918 can be moved to expand a landscape view provided by the handheld device 910. The third display 920, in some implementations, is configured to be opened perpendicular to the movement of the second display 918. With this configuration the third display 920 can be used, for example, to display menus, notifications, application and/or other such graphical content while a video is being played back cooperatively across both the first display 912 and the second display 918. When in their open positions, the first, second and third displays are simultaneously visible to the user, and one or more controllers can control the graphical content to independently or cooperatively display content across one or more of the displays.

Figure 10:
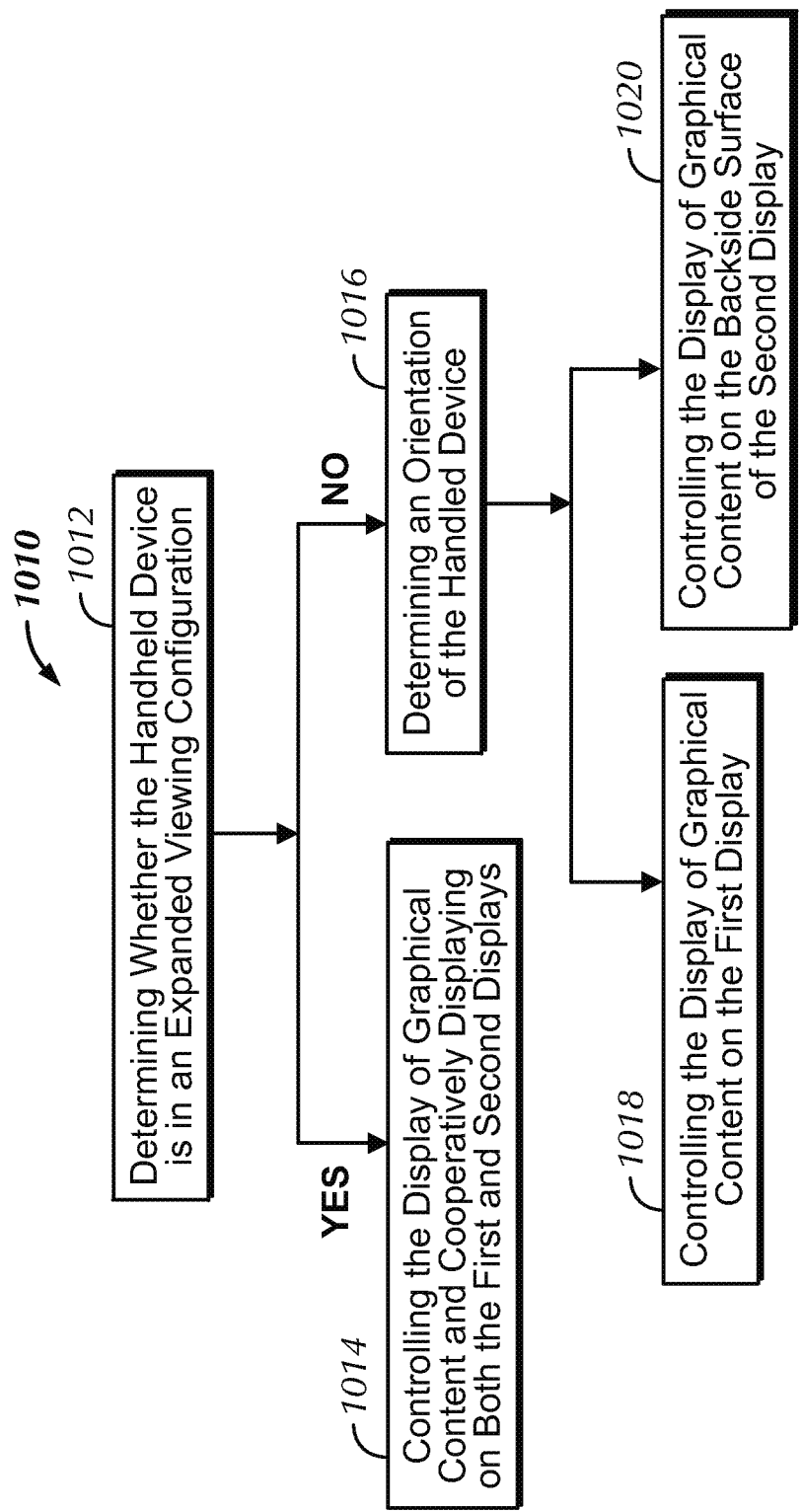
FIG. 10 depicts a simplified flow diagram of a process of cooperatively displaying content on one or more displays of a handheld device, in accordance with some embodiments.

FIG. 10 depicts a simplified flow diagram of a process 1010 of cooperatively displaying content on one or more displays of a handheld device 110, in accordance with some embodiments. In step 1012, a controller of the handheld device determines whether the handheld device is in an expanded viewing configuration. As described above, when in the expanded or open viewing configuration, a first display 112 of the handheld device 110 is positioned adjacent a second display 114 of the handheld device, with the first display and a front side of the second display being simultaneously visible to a user. In some embodiments, the first display 112 is secured within a first display casing 118 and the second display 114 is secured within a second display casing 120, with the second display casing being moveably secured relative to the first display casing and configured to move between a single display viewing position and an expanded viewing position.

When the handheld device 110 is in the expanded viewing configuration, the process advances to step 1014 to control the display of graphical content to cooperatively utilize both the first display 112 and the second display 114 and cooperatively display the graphical content on the first display and the second display. In some embodiments, the graphical content is cooperatively displayed simultaneously over both the first display and the second display. For example, a first portion of each frame of a video can be displayed on the first display 112 while the remainder of each frame is displayed on the second display 114 such that the two displays effectively provide an enlarged viewing area, and allow the video to be displayed in a larger format. Some embodiments further take into consideration the orientation of the handheld device 110 relative to the user in controlling the display over the first and second displays (e.g., whether the user is holding the handheld device with the displays in a landscape mode or a portrait mode).

Further, when it is determined that the handheld device 110 is not in the expanded viewing configuration and instead is in a single display configuration, the process advances to step 1016 where an orientation of the handheld device is determined. In step 1018, when the handheld device is oriented with the first display 112 being visible to the user, the display and/or playback of the graphical content is controlled to be displayed on the first display 112. Optionally, in step 1020 when it is determined that the handheld device is oriented such that the backside display surface 150 of the second display 114 is visible to the user, the display of graphical content is controlled to be displayed on the second display 114 and visible to the user through the backside display surface 150 of the second display.

As further described above, in some embodiments, the handheld device 110 can be configured, when displaying of the graphical content cooperatively utilizing both the first display and the second display, to display the graphical content across both the first display and the second display in a three-dimensional format such that when viewed by a user at least some of the graphical content appears in three dimensions on both the first display and the second display. For example, the graphical content can be displayed in the three-dimensional format to be viewed by the user while the user is wearing filtering lenses. Some embodiments further adjust a portion of the graphical content displayed on the first or second display to compensate for a difference in distance between a front side surface of the first display and a front side surface of the second display when the second display is in the expanded viewing position.

Accordingly, in some implementations, the handheld device 110 and/or the one or more controllers within the handheld device are configured to control two or more displays to cooperatively display content. In some implementations, the two or more displays are utilized as a single large cooperative display area. The configuration of the two or more displays can provide a generally rectangular area. However, other cooperative shapes defined by the multiple displays can be provided. Further, the orientation of the graphical content can be changed as the display configuration of the multiple displays is changed. Again, some devices include one or more orientation sensors or systems, and the controller can be configured to control the graphical content to be displayed on one or more of the multiple displays depending on the detected orientation. Further, the controller can modify the displayed orientation and/or which displays are actively utilized in displaying the graphical content in response to detected changes in orientation and/or in response to conditions, alerts, activations by the user, activations of other applications and/or functions on the handheld device, and the like. Similarly, when display real-estate is added or removed from the cooperative display area (e.g., a display is moved between the open and closed position or vice versa), the handheld device can implement changes, for example, to the aspect ratio of the graphical content (e.g., from landscape to portrait or vice versa). Further, a controller in controlling the display of the graphical content may include rotating the graphical content 90 degrees or 180 degrees to maintain a relevant orientation relative to the detected orientation of the handheld device and/or to maintain a landscape or portrait overall aspect ratio.

Additionally, in some embodiments, the controller can determine, when playing back graphical content, a largest portion of the cooperative display area that corresponds to an aspect ratio of the graphical content and display the graphical content within that identified largest portion of the display area. Further, the controller may identify a benefit of repositioning and/or rotating the displayed graphical content, such as when a fit is not exact or larger area can be utilized. The identification of available cooperative display area and/or repositioning of the graphical content can be useful, for example, when the one of the displays and/or the cooperative display area does not correspond to the aspect ratio of the graphical content, the display area is not consistent with a desired shape (e.g., rectangular), or the like. For example, in some instances additional display or screen real-estate is provided by opening one or more additional displays (e.g., moving the second display 114 into the open position), including opening displays to a top and/or side of a first or main display of the handheld device (e.g., forming an L shape of displays), or when display real-estate is added that does not have the same dimension along an edge where it is added, as is the case where a smaller display is added to one side of a first display. Further, the controller in some implementations can notify a user (e.g., displaying a notification or graphic, illuminating an LED, etc.) that additional display real estate is available (e.g., displaying a graphic and/or animation notifying the user that a one or more displays may be moved to open positions).

In other embodiments, one or more of the displays can be reserved for predefined and/or special graphical content, and therefore, not be considered part of a cooperative display area of the visible displays. Similarly, a handheld device may define multiple separate cooperative display areas when there is sufficient display area available. The separate display areas can be used for different graphical content, such as but not limited to things displaying controls, status, or other applications. For example, the controller can cause a video to be playing back on a first or main display area, which may comprise some or all of multiple displays. At the same time, playback controls and timeline interface showing the playback and/or buffering status may be displayed in a separate display area, which also may comprise some or all of multiple displays. As another example, when the handheld device is a smart phone and an incoming call is received, a first display area of the cooperative display area can continue to display a first graphical content, and a second display area of the cooperative display area that is displaying video controls can be utilized to display information about the incoming call without interrupting the video playback in the first display area.

Further, applications and/or programming operating on the handheld device 110 can be notified dynamically by the controller of changes in available cooperative display areas as one or more displays (e.g., second display 814 and/or third display 860) become available and unavailable. The notification of available display area can be utilized in cooperation with notifications about dynamic changes in the orientation of the one or more displays (e.g., changing from horizontal to vertical when the user tilts their device). Similarly, the controller can confirm that the side of the display (e.g., front side display surface 132 of the second display) is utilized in displaying the graphical content when the controller determines the orientation of the device. For example, when a transparent or two sided second display 114 is paired with a first or main display 112, the controller and/or control system of the device can ensure that the side of the second display that is used to display the graphical content is consistent with the display side surface of the first display being viewed by the user.

Further, in some embodiments, when the second display 114 comprises a sliding back panel and has front side display surface 132 and a backside display surface 150, the controller can detect the sliding out of the second display casing 120 and second display 114 and cause the system to turn off the backside display surface 150 and turn on the front side display surface 132 of the second display. This can save battery power needed to run the backside display surface of the second display when the user is viewing the front side display surface real-estate. Optionally, the system may leave the backside display surface on, although the backside display surface 150 would be a separate display area from the front side display surface 132. This would allow the user to flip over the handheld device 110 to see more screen real-estate on the back of the handheld device.

Similarly, when the handheld device 110 includes a display (e.g., second display 114) that has front side display surface 132 and a rear or backside display surface 150, the controller can determine an orientation of the handheld device 110 (e.g., use an orientation sensor) and turn off power to the front side display surface 132 or the backside display surface 150 that is facing away from the user and/or toward the ground. As the handheld device 110 is likely to be viewed by the user holding the device, the user would not be able to view the display surface facing away from the user holding the device (e.g., while sitting or standing). Again, the powering down of the non-used display surface can result in significant saving in the amount of battery power as only part of the screen real-estate needs to be powered at any time. In some embodiments, the user has an option to turn this feature off or flip which display is turned off (e.g., for situations where the user is lying down holding the device up or the device is being viewed by multiple people simultaneously).

Figure 11:
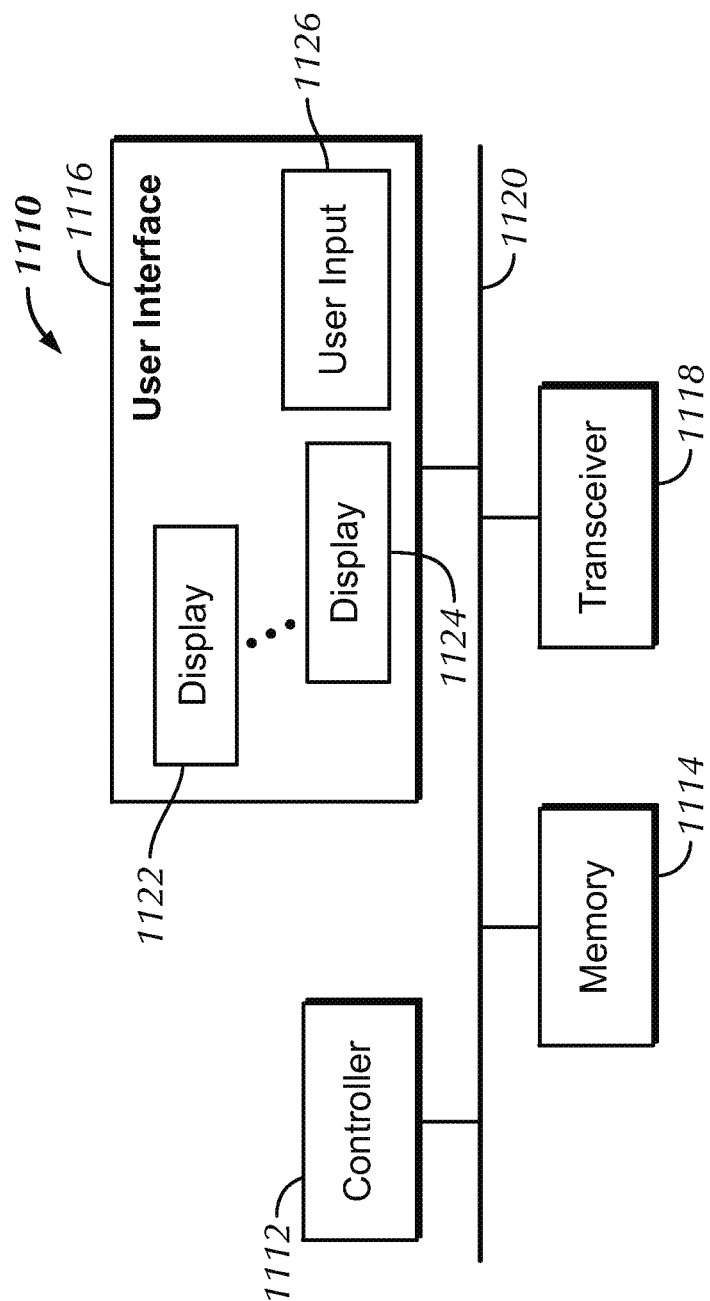
FIG. 11 illustrates a system for use in implementing methods, techniques, devices, apparatuses, systems, servers, sources and the like in providing user interactive virtual environments in accordance with some embodiments.

The devices, systems, methods, techniques, mechanisms and the like described herein may be utilized, implemented and/or utilized in different types of devices and/or systems. Referring to FIG. 11, there is illustrated a system 1100 that may be used for any such implementations, in accordance with some embodiments. One or more components of the system 1100 may be used for implementing any device, system, or apparatus mentioned above or below, or parts of such devices, systems or apparatuses, such as for example any of the above or below mentioned handheld devices 110, 710, 810, 910, consumer electronic devices, display systems, displays, controllers, control systems, multimedia processing systems, image processing systems, detector processing systems, 3D processing systems, 3D compensation systems, 3D coordinate determination systems, graphical content generator systems, orientation tracking systems and the like, or combinations thereof. However, the use of the system 1100 or any portion thereof is certainly not required.

By way of example, the system 1100 may comprise one or more controllers or processor modules 1112, memory 1114, user interfaces 1116, and one or more communication links, paths, buses or the like 1120. A power source or supply (not shown) is included or coupled with the system 1100. The controller 1112 can be implemented through one or more processors, microprocessors, central processing unit, logic, local digital storage, firmware and/or other control hardware and/or software, and may be used to execute or assist in executing the steps of the methods and techniques described herein, including cooperatively utilizing multiple displays of the handheld device, and control various communications, programs, content, listings, services, interfaces, etc. The user interface 1116 includes two or more displays 1122, 1124, and allows a user to interact with the system 1100 and receive information through the system. In some instances, the user interface 1116 further includes one or more user inputs 1126, such as one or more touch sensitive displays, buttons, keyboard, mouse, track ball, remote control, joystick, etc., which can be part of or wired or wirelessly coupled with the system 1100.

Typically, the system 1100 further includes one or more communication interfaces, ports, transceivers 1118 and the like allowing the system 1100 to communication over a distributed network, a local network, the Internet, communication link 1120, other networks or communication channels with other devices and/or other such communications. Further the transceiver 1118 can be configured for wired, wireless, optical, fiber optical cable or other such communication configurations or combinations of such communications.

The system 1100 comprises an example of a control and/or processor-based system with the controller 1112. Again, the controller 1112 can be implemented through one or more processors, controllers, central processing units, logic, software and the like. Further, in some implementations the controller 1112 may provide multiprocessor functionality.

The memory 1114, which can be accessed by the controller 1112, typically includes one or more processor readable and/or computer readable storage media accessed by at least the controller 1112, and can include volatile and/or nonvolatile media, such as RAM, ROM, EEPROM, flash memory and/or other memory technology. Further, the memory 1114 is shown as internal to the system 1110; however, the memory 1114 can be internal, external or a combination of internal and external memory. The external memory can be substantially any relevant memory such as, but not limited to, one or more of flash memory secure digital (SD) card, universal serial bus (USB) stick or drive, other memory cards, hard drive and other such memory or combinations of such memory. Further, the memory 1114 is shown external to the controller 1112; however, some or all of the memory 1114 may include memory that internal to the controller 1112. The memory 1114 can store code, software, executable, applications, scripts, data, content, multimedia content, graphical user interface content, coordinate information, 3D environment coordinates, orientation information and/or parameters, programming, programs, media streams, media files, textual content, identifiers, log or history data, user information and the like.

One or more of the embodiments, devices, methods, processes, approaches, and/or techniques described above or below may be implemented in one or more computer programs executable by a processor-based system. By way of example, such a processor based system may comprise the processor based system 1100, a smart phone, tablet, laptop, a computer, a television, an IP enabled television, a Blu-ray player, an IP enabled Blu-ray player, gaming device and/or console, etc. Such a computer program may be used for executing various steps and/or features of the above or below described methods, processes and/or techniques. That is, the computer program may be adapted to cause or configure a processor-based system to execute and achieve the functions described above or below. For example, such computer programs may be used for implementing any embodiment of the above or below described steps, processes or techniques for allowing the cooperative utilization of multiple displays of a device, and in some instances the simultaneous and cooperative display of graphical content across multiple displays such that the multiple displays provide a single cooperative display area over which the graphical content is displayed. As another example, such processor and/or computer programs may be used for implementing any type of tool or similar utility that uses any one or more of the above or below described embodiments, methods, processes, approaches, and/or techniques. In some embodiments, program code modules, loops, subroutines, etc., within the computer program may be used for executing various steps and/or features of the above or below described methods, processes and/or techniques. In some embodiments, the computer program may be stored or embodied on a computer readable storage or recording medium or media, such as any of the computer readable storage or recording medium or media described herein.

Accordingly, some embodiments provide a processor or computer program product comprising a medium configured to embody a computer program for input to a processor or computer and a computer program embodied in the medium configured to cause the processor or computer to perform or execute steps comprising any one or more of the steps involved in any one or more of the embodiments, methods, processes, approaches, and/or techniques described herein. For example, some embodiments provide one or more computer-readable storage mediums storing one or more computer programs for use with a computer simulation, the one or more computer programs configured to cause a computer and/or processor based system to execute steps comprising: determining, through a controller of the handheld device, whether the handheld device is in an expanded viewing configuration with a first display of the handheld device positioned adjacent a second display of the handheld device when the second display is in an expanded viewing position such that the first display and a front side display surface of the second display are simultaneously visible to a user, wherein the first display is secured within a first display casing and the second display is secured within a second display casing that is moveably secured relative to the first display casing and configured to move between a single display viewing position and the expanded viewing position; controlling the display of graphical content, when it is determined that the handheld device is in the expanded viewing configuration, cooperatively utilizing both the first display and the second display and cooperatively displaying the graphical content simultaneously on both the first display and the second display; determining an orientation of the handheld device when it is determined that the handheld device is in the single display configuration and not in the expanded viewing configuration; controlling the display of graphical content to be displayed on the first display when it is determined that the handheld device is in the single display configuration and oriented with the first display being fully visible to the user; and controlling the display of graphical content to be displayed on the second display and visible to the user through a backside surface of the second display when it is determined that the handheld device is in the single display configuration and oriented with the backside surface of the second display being fully visible to the user.

Further, some embodiments provide portable handheld devices comprising: a first display; a second display, wherein the first display and the second display are configured to display graphical content comprising one or more of a graphical user interfaces and multimedia content; a controller configured to control the first display and the second display in displaying the graphical content on one or both of the first display and the second display; and a casing comprising a first display casing and a second display casing, wherein the first display is secured within the first display casing, and the second display is secured within the second display casing, wherein the second display casing is moveable relative to the first display casing and configured to be moved between a closed position and an open position and to position the second display relative to the first display; wherein, when the second display casing is in the closed position, at least a majority of the second display is not visible when the casing is oriented such that the first display is fully visible to a user and configured to display the graphical content; wherein, when the second display casing is in the open position, both the first display and the second display are fully visible and configured to display the graphical content; wherein the second display casing further comprises a display alignment assembly cooperated with the second display wherein the display alignment assembly is configured move the second display, when the second display casing is in the open position, parallel to a first axis that is substantially perpendicular to a front side display surface of the second display through which the user views the graphical content such that the second display is substantially aligned along a plane with the first display; and wherein the controller is configured to cooperatively utilize both the first display and the second display when the second display casing is in the open position such that the graphical content is cooperatively displayed on both the first display and the second display.

Some embodiments provide methods of displaying content on a portable handheld device, the methods comprising: determining, through a controller of the handheld device, whether the handheld device is in an expanded viewing configuration with a first display of the handheld device positioned adjacent a second display of the handheld device when the second display is in an expanded viewing position such that the first display and a front side of the second display are simultaneously fully visible to a user, wherein the first display is secured within a first display casing and the second display is secured within a second display casing that is moveably secured relative to the first display casing and configured to move between a single display viewing position and the expanded viewing position; controlling the display of graphical content, when it is determined that the handheld device is in the expanded viewing configuration, cooperatively utilizing both the first display and the second display and cooperatively displaying the graphical content simultaneously on both the first display and the second display; determining an orientation of the handheld device when it is determined that the handheld device is in the single display configuration and not in the expanded viewing configuration; controlling the display of graphical content to be displayed on the first display when it is determined that the handheld device is in the single display configuration and oriented with the first display being fully visible to the user; and controlling the display of graphical content to be displayed on the second display and visible to the user through a backside surface of the second display when it is determined that the handheld device is in the single display configuration and oriented with the backside surface of the second display being fully visible to the user.

While the invention herein disclosed has been described by means of specific embodiments, examples and applications thereof, numerous modifications and variations could be made thereto by those skilled in the art without departing from the scope of the invention set forth in the claims.

What is claimed is:

1. A portable handheld device comprising:
a first display;
a second display, wherein the first display and the second display are configured to display graphical content comprising one or more of a graphical user interfaces and multimedia content;
a controller configured to control the first display and the second display in displaying the graphical content on one or both of the first display and the second display; and
a casing comprising a first display casing and a second display casing, wherein the first display is secured within the first display casing, and the second display is secured within the second display casing, wherein the second display casing is moveable relative to the first display casing and configured to be moved between a closed position and an open position and to position the second display relative to the first display;
wherein, when the second display casing is in the closed position, at least a majority of the second display is not visible when the casing is oriented such that the first display is visible to a user and configured to display the graphical content;
wherein, when the second display casing is in the open position, both the first display and the second display are visible and configured to display the graphical content; and
wherein the controller is configured to cooperatively utilize both the first display and the second display when the second display casing is in the open position such that the graphical content is cooperatively displayed on both the first display and the second display.

2. The portable handheld device of claim 1, wherein the second display casing further comprises a display alignment assembly cooperated with the second display wherein the display alignment assembly is configured to move the second display, when the second display casing is in the open position, parallel to a first axis that is substantially perpendicular to a front side display surface of the second display through which the user views the graphical content such that the second display is substantially aligned along a plane with the first display.

3. The portable handheld device of claim 2, wherein the controller is configured to display the graphical content, when the second display casing and second display are in the open position, across both the first display and the second display in a three-dimensional format such that when viewed by a user at least some of the graphical content appears in three dimensions on both the first display and the second display.

4. The portable handheld device of claim 2, wherein the controller is configured to utilize the first display and the second display cooperatively as a single display such that the graphical content is displayed across both the first display and the second display.

5. The portable handheld device of claim 2, wherein the casing further comprises a first slide assembly cooperated with the second display casing configured to allow the second display casing and the second display to slide relative to the first display casing parallel with a second axis between the closed position and the open position.

6. The portable handheld device of claim 1, wherein the casing further comprises a first slide assembly cooperated with the second display casing configured to allow the second display casing and the second display to slide relative to the first display casing parallel with a second axis between the closed position and the open position wherein the second axis is substantially parallel with a front side display surface of the first display through which the user views the graphical content displayed on the first display.

7. The portable handheld device of claim 6, wherein the first display casing is positioned adjacent and in contact with the second display casing when the second display casing is in the open position.

8. The portable handheld device of claim 7, wherein the second display casing further comprises a display alignment assembly cooperated with the second display wherein the display alignment assembly is configured to move the second display, when the second display casing is in the open position, parallel to a first axis that is substantially perpendicular to a front side display surface of the second display through which the user views the graphical content such that the second display is substantially aligned along a plane with the first display.

9. The portable handheld device of claim 6, wherein the second display is positioned on an opposite side of the first display casing from the first display when the second display casing is in the closed position, wherein the controller is configured to display, when the second display casing is in the closed position, the graphical content visible through the first display or through a backside display surface of the second display that is opposite the front side display surface of the second display and oriented away from a front side display surface of the first display.

10. The portable handheld device of claim 6, wherein the controller is configured to detect an orientation of the portable handheld device and display the graphical content to be visible on the backside display surface of the second display when the second display casing is in the closed position and the portable handheld device is in an orientation such that the backside display surface of the second display is determined to be directed toward a user while the first display is directed away from the user.

11. The portable handheld device of claim 1, further comprising:
a single camera;
optics such that the single camera is configured to receive image data from a front side direction and a backside direction; and
a camera system controller configured to cause the single camera to capture image data from only one of the front side direction or the backside direction depending on an orientation.

12. The portable handheld device of claim 1, wherein the casing comprises an opening configured to receive the second display casing and the second display when the second display and the second display casing are in the closed position.

13. The portable handheld device of claim 1, further comprising:
a third display,
wherein the casing comprises a third display casing with the third display secured within the third display casing, wherein the third display casing is moveable relative to the first display casing and configured to be moved between a closed position of the third display and an open position of the third display and to position the third display relative to the first display;
wherein, when the third display casing is in the closed position, at least a majority of the first display is not visible and obscured by the third display; and
wherein the controller is configured to cooperatively utilize both the first display and the third display when the third display casing is in the open position.

14. A method of displaying content on a portable handheld device, the method comprising:
determining, through a controller of the handheld device, whether the handheld device is in an expanded viewing configuration with a first display of the handheld device positioned adjacent a second display of the handheld device when the second display is in an expanded viewing position such that the first display and a front side of the second display are simultaneously visible to a user, wherein the first display is secured within a first display casing and the second display is secured within a second display casing that is moveably secured relative to the first display casing and configured to move between a single display viewing position and the expanded viewing position;
controlling the display of graphical content, when it is determined that the handheld device is in the expanded viewing configuration, cooperatively utilizing both the first display and the second display and cooperatively displaying the graphical content simultaneously on both the first display and the second display;
determining an orientation of the handheld device when it is determined that the handheld device is in the single display configuration and not in the expanded viewing configuration;
controlling the display of graphical content to be displayed on the first display when it is determined that the handheld device is in the single display configuration and oriented with the first display being visible to the user; and
controlling the display of graphical content to be displayed through a backside surface of the second display when it is determined that the handheld device is in the single display configuration and oriented such that the backside surface of the second display is not substantially obscured by the handheld device.

15. The method of claim 14, wherein the controlling the display of the graphical content cooperatively utilizing both the first display and the second display comprises displaying the graphical content across both the first display and the second display in a three-dimensional format such that when viewed by a user at least some of the graphical content appears in three dimensions on both the first display and the second display.

16. The method of claim 15, wherein the displaying the graphical content in the three-dimensional format comprise adjusting a portion of the graphical content displayed on the second display compensating for a difference in distance between a front side surface of the first display and a front side surface of the second display when the second display is in the expanded viewing position.

17. The method of claim 15, wherein the displaying the graphical content in the three-dimensional format comprise displaying the graphical content in the three-dimensional format to be viewed by the user while the user is wearing filtering lenses.

18. The method of claim 14, further comprising:
aligning the second display, while in the expanded viewing position, such that the second display is substantially aligned along a plane with the first display by moving the second display parallel to a first axis that is substantially perpendicular to the front side display surface of the second display.

19. The method of claim 18, further comprising:
configuring the second display casing such that the second display casing and the second display slide, relative to the first display, along a second axis that is substantially perpendicular to the first axis between the single display viewing position and the expanded viewing position.

\* \* \* \* \*